US006608701B1

(12) United States Patent
Loce et al.

(10) Patent No.: US 6,608,701 B1
(45) Date of Patent: Aug. 19, 2003

(54) COMPACT HIGH ADDRESSABILITY RENDERING

(75) Inventors: Robert P. Loce, Webster, NY (US); Michael Branciforte, Rochester, NY (US); Fritz F. Ebner, Rochester, NY (US); Douglas N. Curry, Menlo Park, CA (US); Yeqing Zhang, Penfield, NY (US); Leon C. Williams, Walworth, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/348,378

(22) Filed: Jul. 7, 1999

(51) Int. Cl.[7] .................................................. G06K 9/36
(52) U.S. Cl. ..................................... 358/3.09; 358/3.14
(58) Field of Search ............................... 358/3.09–3.19, 358/1.9, 465–466; 382/237

(56) References Cited

U.S. PATENT DOCUMENTS

| 4,150,400 A | * | 4/1979 | Wong | 382/276 |
| 4,437,122 A | * | 3/1984 | Walsh et al. | 348/625 |
| 5,274,472 A | | 12/1993 | Williams | 358/455 |
| 5,390,263 A | | 2/1995 | Guay et al. | 382/50 |
| 5,485,289 A | | 1/1996 | Curry | 358/448 |
| 5,608,821 A | | 3/1997 | Metcalfe et al. | 382/252 |
| 5,742,703 A | | 4/1998 | Lin et al. | 382/176 |
| 6,449,396 B1 | * | 9/2002 | Loce et al. | 382/276 |

FOREIGN PATENT DOCUMENTS

| EP | 1067765 A2 | * | 1/2001 | H04N/1/405 |
| JP | 2001094783 A | * | 4/2001 | H04N/1/405 |

* cited by examiner

Primary Examiner—Thomas D. Lee
Assistant Examiner—Stephen Brinich
(74) Attorney, Agent, or Firm—William Eipert

(57) ABSTRACT

A compact rendering processor for processing image data including a multi-bit halftone region generates high addressability pixels. The compact rendering processor includes a tagging sub-processor operating on the image data to identify a target pixel and a neighboring pixel to determine a fill-order. The compact rendering processor also includes a rendering sub-processor that converts the target pixel into a high addressability pixel based upon the fill-order. Optionally, a diffusion sub-processor can be included to diffuse an error resulting from the conversion of the target pixel into a high addressability pixel to other pixels within the image data.

21 Claims, 12 Drawing Sheets

COMPACT HIGH ADDRESSABILITY RENDERING

Cross reference is made to the following related applications "Compact-Dot Reproduction Of Scanned Halftone Screens" by R. Loce et al., U.S. patent application Ser. No. 09/348,398 and "Compact Rendering For Processing Binary High Addressability Images" by R. Loce et al., U.S. patent application Ser. No. 09/348,871 (U.S. Pat. No. 6,449,396 B1).

BACKGROUND OF THE INVENTION

The present invention relates to an imaging architecture for producing high addressability binary images, and more particularly, to an imaging method and apparatus to convert multi-bit pixels, including both halftone and antialiased images, to high addressability binary images.

In the reproduction or display of images from image data representing an original or scanned document one is faced with the limited resolution capabilities of the rendering system and the fact that many output devices are binary or require compression to binary for storage efficiency. Further complicating the reproduction or display of images is the reality that image output terminals must be able to process a variety of different image types including grayscale or continuous tones (contone), halftones of various frequencies, text/line art, etc. as well as image data comprising any combination of the above. Moreover, while an image processing system may be tailored so as to offset the limited resolution capabilities of the rendering apparatus, this tailoring is difficult due to the divergent processing needs required by different image types.

Optimizing a system for one common image type typically comes at the expense of degraded rendering of other image types. Consider, for example, printing a document having both contone pictorial data and text/line art on a binary printing system such as many xerographic or ink jet systems. Binary printing systems generally use a halftoning process to simulate continuous tone images. Conventional halftone screens employed by binary printers have a s frequency approximately equal to 130–150 cpi dots. However, when rendering gray edge pixels, such as antialiased edge pixels common in text/line art, a very high frequency cell, ideally one having a frequency similar to the pixel resolution of the final output image, should be employed. Using a standard system halftone dot at the standard halftone frequency (e.g., approximately 130–150 cpi dots) to render antialiased pixels results in jagged edges often with objectionable halftone dots positioned along the edges of lines and characters. On the other hand, the use of a very high frequency screen over the entire image renders the antialiased pixel properly but introduces objectionable image artifacts in pictorial image areas and tends to sharpen the tonal curve and provoke print quality defects in the overall image.

A common goal in the development of printers and printing systems is improving image quality. High addressability imaging techniques have proven very successful in improving the image quality of printing systems. However, the divergent processing needs required by different images types are particularly evident in printing systems generating high addressability pixels. The use of high addressability rendering for both antialiased text/line art and pictorial contones has led to the development of printing systems having multiple rendering processors. Specifically, because available decomposers, generally cannot perform high quality, high addressability rendering of text/line art, it is desirable to include dedicated hardware to perform high addressability rendering on antialiased text/line art in addition to a processor to render high addressability halftones. While such systems produce high quality output images, the need for multiple processors for different image types greatly increases the complexity and cost of the hardware and software modules required by the systems.

As with printing systems, improving image quality is a continuing concern when developing scanning devices and reproducing images from scanned data. To address the divergent processing needs of different images types when reproducing images from scanned data, scanning devices generally rely on automatic image segmentation techniques to identify different image types within image data and classify pixels accordingly. Based on the classification, the image data may then be processed according to the properties of that class of imagery. However, simply accurately identifying the image type does not guarantee image quality.

Consider the problem of scanning a halftone image. To accurately reproduce scanned halftone images, it is desirable to reproduce the screen of the printed halftone image. If the frequency of the scanned halftone is sufficiently low, below 130 cpi, many existing reproduction systems attempt to reproduce an image with its given halftone screen (ie., no descreening) by employing simple thresholding, error diffusion or similar processing. While this halftone replication method works well for some low frequency screens, with middle frequency and higher frequency screens, it tends to introduce unwanted artifacts that degrade image quality. Thus, higher frequency halftones are typically low pass filtered (descreened) and then re-screened with a halftone that is suitable for the intended printer. While the above process accurately reproduces scanned images, it has some drawbacks. The descreening process typically introduces blur into the image. Furthermore, although passing scanned halftones using error diffusion can be used to accurately reproduce low frequency halftone screens without introducing serious artifacts, it does not ensure the rendered image has compact halftone dots resulting in images which are prone to noise and instability.

The following references may be found relevant to present detailed disclosure.

U.S. Pat. No. 5,274,472 to Williams discloses a method to convert gray level image data from image input terminals into binary data for high addressability image output terminals.

U.S. Pat. No. 5,485,289 to Curry discloses a printing system for rendering bitmapped image data on a photosensitive recording medium. The system includes a data source for supplying grayscale input image data and a scanning device for rendering grayscale output image data onto the recording medium.

U.S. Pat. No. 5,742,703 to Lin et al. discloses a method and apparatus for resolution enhancement of gray-scale input images including text and line art, and more particularly to a filtering method and image processing apparatus for enhancement of high contrast line edges found in grayscale images without requiring that the input image data include predetermined tag bits to identify region types.

SUMMARY OF THE INVENTION

In accordance with the present invention, there is provided a method of processing multi-bit image data, comprising the steps of identifying an observation window within the multi-bit image data, the observation window including a target pixel and a neighboring pixel; determining a fill-order for the target pixel; and rendering the target pixel as a function of the fill-order.

In accordance with another aspect of the present invention, there is provided a compact rendering processor for processing image data having a multi-bit halftone region therein. The compact rendering processor includes a tagging sub-processor coupled to receive the image data. The tagging subprocessor identifies a target pixel and a neighboring pixel and generates a rendering tag. A rendering sub-processor, coupled to receive the target pixel and the rendering tag, is responsive to the rendering tag to generate a high addressability pixel for the target pixel.

In accordance with a further aspect of the present invention, there is provided a printing system including a digital front end coupled to receive an image file and generate multi-bit image data. The digital front end is operative to generate multi-bit image data having both multi-level halftone regions and antialiased pixels. The printing system also includes a compact rendering module for converting said multi-bit image data into, high addressability pixels and a marking engine, coupled to the compact rendering module, for generating an image on a receiving medium in response to said high addressability pixels.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying, drawings wherein like reference numerals and symbols designate identical or corresponding parts throughout the several views and wherein.

DETAILED DESCRIPTION OF THE INVENTION

Figure 1:
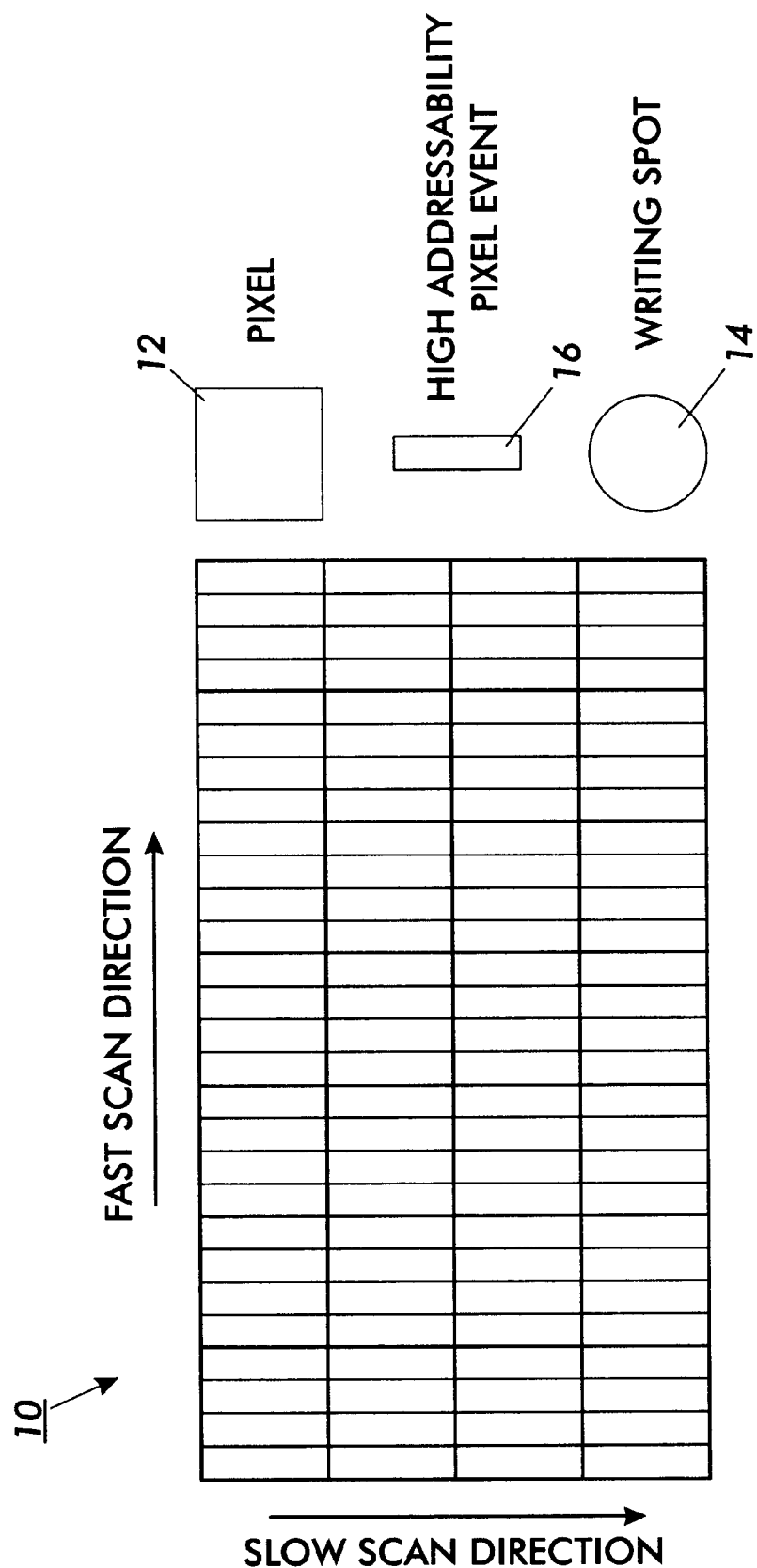
FIG. 1 is a schematic illustration of an exemplary high addressability pixel grid.

For a general understanding of the present invention, reference is made to the drawings. The present invention is described herein as processing grayscale continuous tone (contone) image data. However, it should be understood that the present invention applies equally well to the processing of color images, wherein each color image separation is treated, effectively, as a gray-scale image. Accordingly, references herein to the processing of gray-scale images are intended to include the processing of color image separations as well.

In describing the present invention, the terms "data" and "pixel" refer to physical signals that include information or indicate a representation of an image. An "image" refers to a pattern of physical light, may include characters, words, and text as well as other features such as graphics. An image may be divided into "regions" or "segments," each of which is itself an image. A region or segment of an image may be of any size up to and including the whole image. An operation performs "image processing" when it operates on an item of data that relates to part of an image.

Each location in an image may be called a "pixel." The term "pixel" may refer to an electrical, (or optical, if fiber optics are used), signal which represents physical optical properties at a physically definable area on an image. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An image may be a high addressability image. High addressability refers to an imaging method where the imaging device can position the writing spot with precision finer than the size of the writing spot. For instance, a typical 600 spot per inch (spi) high addressability system may operate with a 40 micron writing spot, an addressability of 600/inch in the direction perpendicular to the raster lines, and an addressability of 4800/inch in the direction of the raster lines. Systems that write high addressability images typically regulate a laser or similar writing device using clock modulation, amplitude modulation, pulse width position modulation, pulse-width modulation or equivalent procedures.

High addressability also refers to writing an image with a higher sampling resolution than is input to the writing system. In that sense it is a form of resolution enhancement. In the present invention, for notational simplicity, the term high addressability will also refer to pixel sampling resolution that is greater than a nominal or input resolution. For instance, for an input pixel resolution of. 300 spi may be converted to 600 spi using the present invention, and in that resolution conversion setting the output resolution will be referred to as high addressability.

Moreover, an image may be considered a high addressability image if one or more pixels within the image have a high addressability format. A high addressability formatted pixel (i.e., a high addressability pixel) is a pixel comprising a plurality of high addressability pixel events wherein each high addressability pixel event corresponds to a specific spatial placement of the writing spot with respect to the pixel and has a value that represents a property of the writing spot at that specific spatial placement. In a binary high addressability pixel, for example, each high addressability pixel event is a single bit indicating whether the writing spot is "on" or "off" at the corresponding spatial placement.

Illustratively, FIG. 1 is a diagram showing schematic representation of a high addressability image 10. FIG. 1 further shows the size of an exemplary pixel 12 as well as the size of writing spot 14. As can be seen, each pixel within the image is a high addressability pixel having an addressability resolution in one dimension and comprising four high addressability pixel events 16 (e.g., 4×high-addressable, fast scan resolution).

Figure 2:
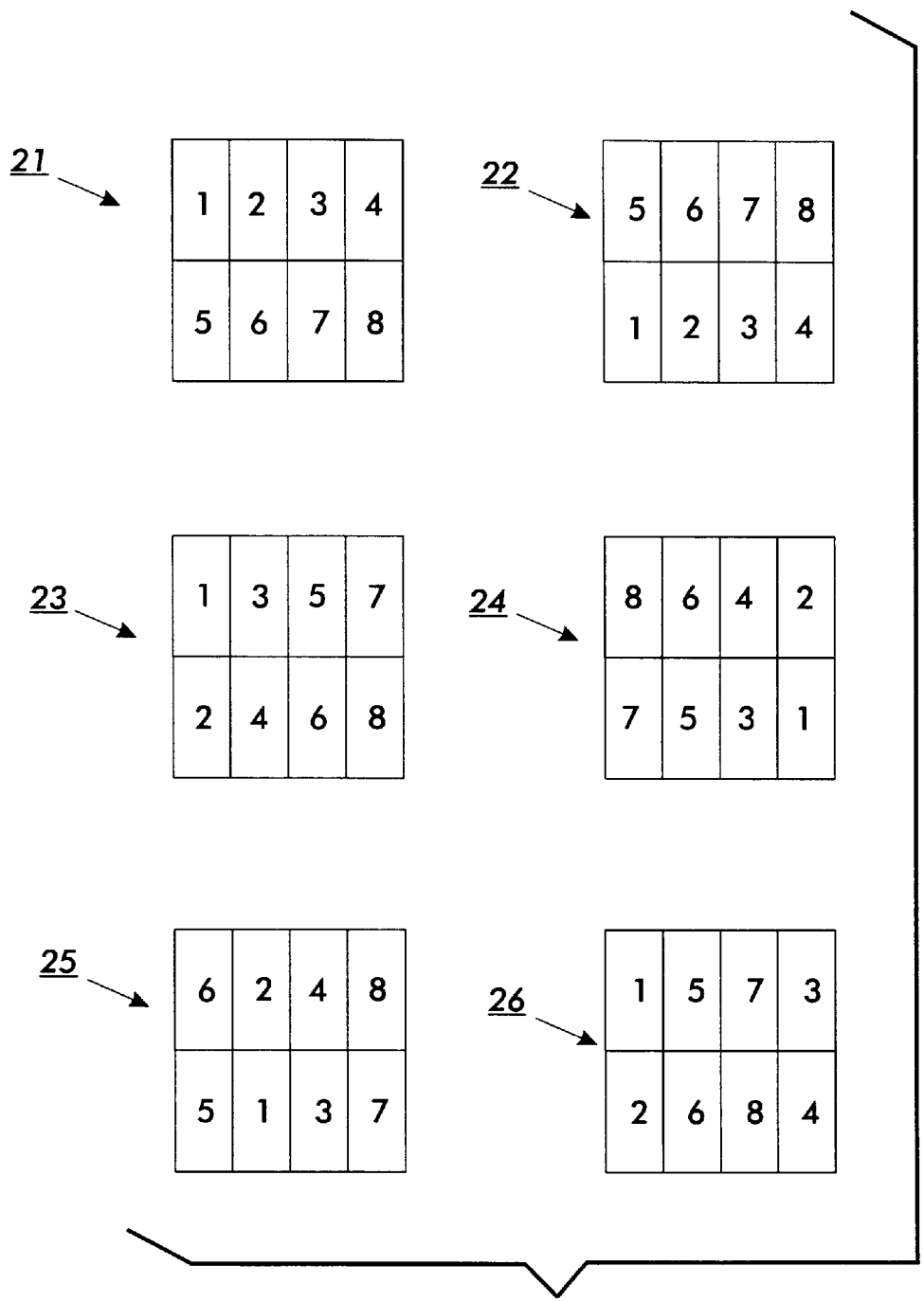
FIG. 2 schematically illustrates exemplary fill orders for use in generating a high-addressability pixel.

The sequence in which the high addressability pixel events are filled is referred to as the "fill-order". The fill-order describes the dot growth of a pixel. It is well-known that, in generating a high addressability pixel, the sequence in which the pixel events are filled (dot growth) effects the size and shape of both the pixel and its neighbors and, thus, image quality. Only a small number of the N! (factorial) fill-orders for sequentially filling N high addressability pixel events are needed to provide desired results. The sequences that provide desired results define a set of fill-orders. Common fill-orders include filling pixel events from the left, the right, the center, a split, the top, the bottom, etc. FIG. 2 schematically illustrates six exemplary fill-orders (top fill 21, bottom fill 22, left fill 23, right fill 24, center fill 25, and split fill 26) for a 4×2 high-addressability pixel wherein the integers 1–8 indicate the order in which the high addressability pixel events are filled. It is appreciated that those skilled in the art will recognize that fewer, or alternative, fill-orders may be employed.

Figure 3:
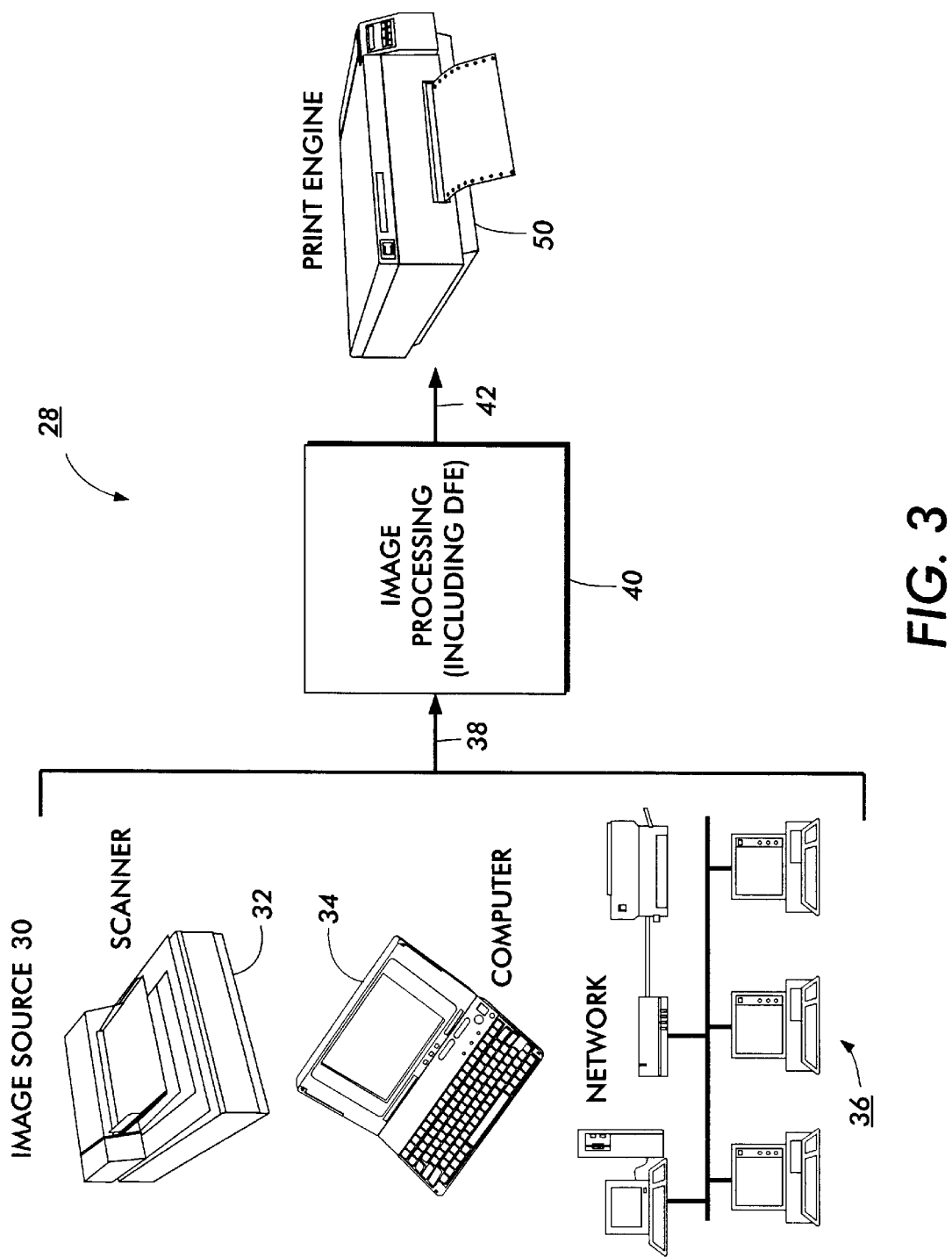
FIG. 3 is a general representation of a suitable system-level embodiment for one or more aspects of the present invention.

Turning now to FIG. 3, there is shown an embodiment of a digital imaging system 28 that incorporates the features of the present invention. Digital imaging system 28 includes image source 30 that may include scanner 32, computer 34, network 36 or any similar or equivalent image input terminal to generate image data 38. Image data 38 is supplied to an image processing system 40, that may incorporate what is known in the art as a digital front end (DFE). Image processing system 40 processes the received image data 38 to produce print ready binary data 42 that is supplied to print engine 50. In response to print ready data 42, print engine 50 generates an output document on suitable media (e.g., print or display). Print engine 50 is preferably a electrophotographic engine; however, engine 50 may include such equivalent alternatives as ink jet, ionographic, thermal, etc. Furthermore, image processing system 40 may be incorporated in electronic display systems such as CRTs, LCDs, LED, etc. The present invention is directed towards aspects of image processing system 40 depicted in FIG. 3. In particular, the present invention is directed to an imaging architecture that renders multi-bit pixels, including both gray halftones and antialiased text/line art, to high addressability pixels.

Figure 4:
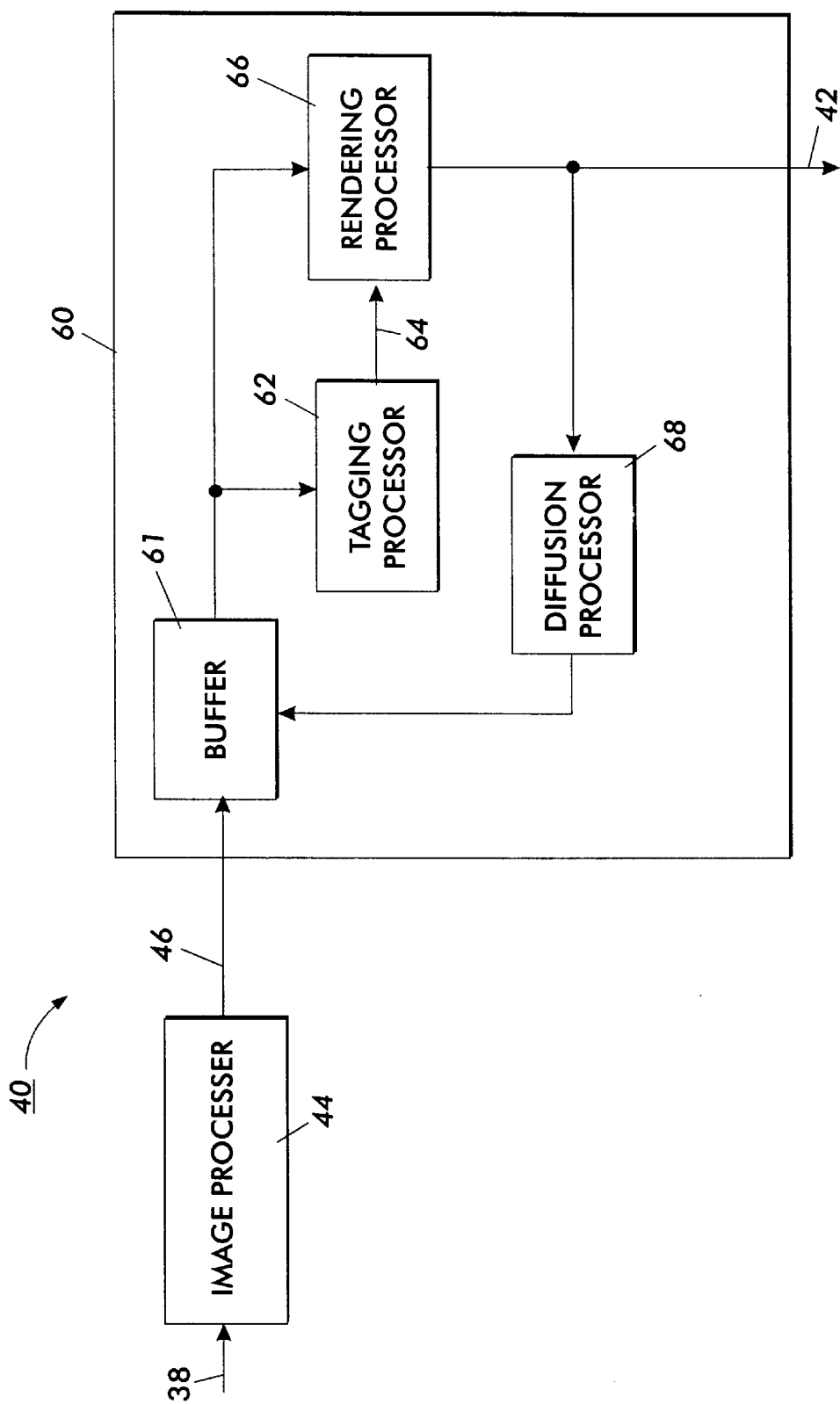
FIG. 4 illustrates a generalized data flow through an image print path in accordance with the present invention.

Referring now to FIG. 4, there is shown a diagram depicting the data flow in an embodiment of the present invention. In FIG. 4, image processing system 40 receives image data 38, which may be either analog or digital voltage representations of an image, and performs image analysis and/or image processing functions (generally identified as image processor 44), which may include page decomposition, background detection, segmentation, color adjustment, etc., on received image data 38 to generate multi-bit digital image data 46. Digital image data 46 may, for example, include gray-scale image data antialiased text/line art regions, multi-level halftone regions, etc.

More specifically, processor 44 may include an antialias filtering operation that operates on text/line art to reduce objectionable image artifacts caused by aliasing in an image sampling operation to yield antialiased text/line art regions. Processor 44 may also include a multi-level halftoning process to generate multi-level halftone regions. In general, multi-level halftoning processes operate on pictorials and tints to convert contone image data having M bits/pixel (e.g., 8-bits or 256 levels) into halftone representations having N bits/pixel where 1<N<M.

Moreover, for image data that has been electronically scanned, multi-bit digital image data 46 may be "generated" using automatic image segmentation techniques that analyze and classify pixels within scanned image data into one of several categories based on the pixel's characteristics. Furthermore, multi-bit image data 46 may be generated by converting data from a binary format, including high addressability pixels, to grayscale or multi-bit pixels. A typical method for converting a high resolution binary image to a gray-scale image uses a convolution or filtering step followed by a scaling or resampling to yield a coarser gray-scale image. Multi-level halftoning processes, antialiasing algorithms, auto-segmentation techniques, and generation of multi-bit image data from high addressability pixels are well known in the art and do not form part of the present invention. Furthermore, it is appreciated that those skilled in the art will recognize that alternative methods may be employed to generate multi-bit digital image data 46.

Multi-bit pixels from digital image data 46 are processed (rendered) into binary print ready data 42 in the form of binary high addressability pixels through compact rendering processor 60 operating in accordance with the present invention. Although shown as a part of image processing system 40, it will be appreciated that compact rendering processor 60 may be part of and reside within print engine 50. In compact rendering processor 60, the multi-bit pixels within image data 46 are coupled to tagging processor 62 and rendering processor 66. Optionally, compact rendering processor 60 includes image buffer 61 that receives image data 46 and buffers a portion of the image data necessary for generating high addressability pixels. Buffer 61, which may comprise a high speed, FIFO-type memory, beneficially stores several scanlines of the image data.

Tagging processor 62 receives multi-bit pixels within digital image data 46 and identifies a target pixel and at least one pixel neighboring the target pixel.

Tagging processor 62 analyzes the neighboring pixel and, based upon the results of the analysis, determines a fill-order for generating a high addressability pixel for the target pixel. It should be noted that the multi-bit pixels from digital image data 46 are analyzed and a fill-order is determined using the same criterion without reference to, or identification of, the pixel type. (i.e., multi-level halftone, antialiased text/line art). Accordingly, tagging processor 62 need not know or determine the type of pixel when analyzing the group of pixels neighboring the target pixel to identify a fill-order. In particular, tagging processor 62 analyzes the values of the target pixel and its neighbors to identify a fill-order that may be used to cause the target pixel to be rendered as a high addressability pixel growing in a predetermined manner such as from darker neighboring pixels or to reproduce an edge.

The output of tagging processor 62 is a rendering tag 64 identifying the fill-order to use in generating high addressability pixels. As should be apparent, tag 64 may be a multiple-bit tag as necessary to identify the various fill-orders used. However, as noted above multi-bit pixels 46 can be processed (rendered) into high addressability pixels in the same manner regardless of image type (e.g., multibit halftone, anti-aliased line art); therefore, rendering tag 64 need only identify a fill-order to use and not the type of pixel to be rendered. However, in situations where an image-type tag is available, variations in the rendering of high addressable pixels could be performed. Rendering tag 64 is supplied to rendering processor 66 to control the processing therein. Rendering processor 66 receives the target pixel along with the associated rendering tag 64 and generates a high addressability pixel for the target pixel based upon rendering tag 64, the gray level value of the target pixel, and, beneficially, the marking process characteristics.

The high addressability pixel generated by rendering processor 66 is provided as print ready data 42 for output on tangible media by print engine 50. Optionally, the high addressability pixel from rendering processor 66 is also coupled to error diffusion processor 68. Diffusion processor 68 generates an error indicative of the difference between gray level of the target pixel and the gray level of the high addressability pixel. Based upon this error measurement, diffusion processor 68 redistributes or diffuses the error to a selected group of unprocessed multi-bit pixels within image data 46 in accordance with a set of error weighting coefficients.

Figure 5:
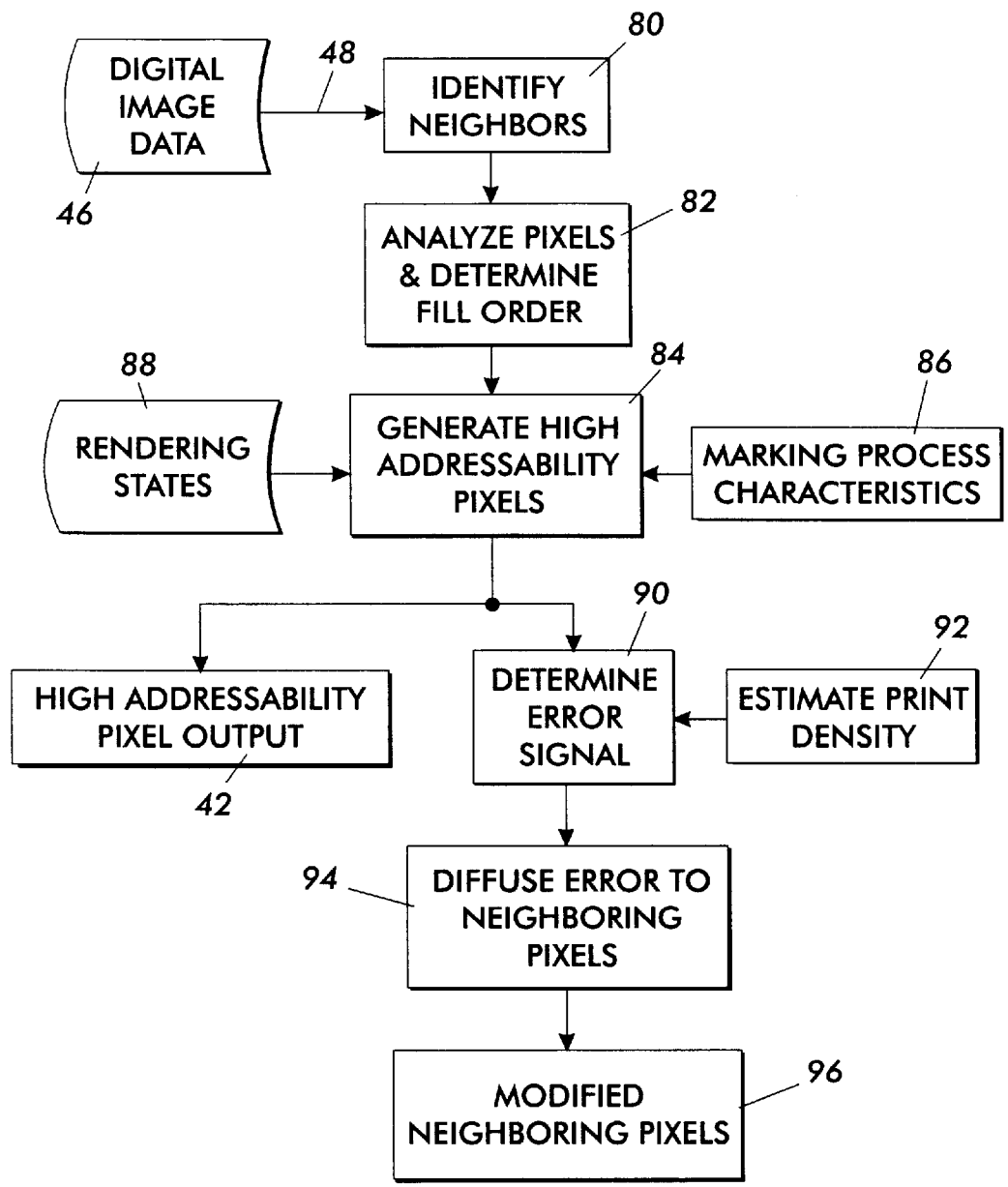
FIG. 5 schematically illustrates an embodiment of a high addressability rendering method in accordance with the present invention.

Having generally described an architecture for a compact rendering processor of the present invention, attention is now turned to a discussion of an embodiment of a compact rendering method to generate high addressability images from multi-bit image data such as scanned halftones, multi-level halftoned images, antialiased images, etc. in accordance with the present invention. Referring now to FIG. 5, there is shown a schematic illustration of various steps in the generation of high addressability pixels in accordance with the present invention and an alternate representation of the data flow through compact rendering processor 60 of FIG. 4.

In FIG. 5 block 80 identifies a multi-bit target pixel from image data 46 and at least one pixel neighboring or near the target pixel. The target and neighboring pixels identified by block 80 comprise an observation window. Beneficially, the observation window comprises either a 3×1 pixel window or a 3×3 pixel window centered on the target pixel. However, it should be appreciated that observation windows having different sizes, shapes, and/or number of pixels may be employed in the practice of the present invention and that the neighboring pixels do not have to touch the target pixel. For example, in a 5×5 pixel observation window centered on the target pixel, each of the 24 pixels surrounding the target pixel are neighboring pixels, even though there may be one or more pixels separating the neighboring and target pixels.

One factor that may be considered in determining the size and shape of the observation window is the addressability resolution of the high addressability pixel. That is, for addressability resolution in one dimension (e.g., 8×high-addressable, fast scan resolution), block 80 may only identify the pixels to the left and right of the target pixel (i.e., a 3×1 window centered on the target pixel). For high addressability pixels having an addressability resolution in two dimensions, block 80 may identify the eight (8) pixels adjoining the target pixel (i.e., a 3×3 window). It should be noted that although a 3×1 window works well to generate high addressability pixels having resolution in one direction, benefits may be obtained from using a 3×3, 5×5, or other two-dimensional pixel widow. For example, the fill-order may vary for gray pixels bordering black pixels depending upon whether the gray pixels are on the lead edge or trail edge of a black pixel wherein the lead and trail edges refer to the orientation with respect to a moving imaging surface such as a photoreceptor belt within a xerographic marking engine. A two-dimensional observation window would provide the information necessary to select the most suitable fill-order in this setting. Moreover, while generation of high addressability pixels having two-dimensional resolution preferably requires a two-dimensional pixel window, such high addressability pixels may be obtained from a one-dimensional pixel window.

At block 82 the target pixel and its neighbors are analyzed to determine a fill-order for the high addressability pixel events of the target pixel and to generate a rendering tag identifying the fill-order. A method that has been found to both properly treat antialiased text/line art and create compact halftone dots grows pixels in such a manner as to attempt to reproduce an edge in the input image. That is, the method treats each gray pixel as if it is within an edge, regardless of the values of the neighboring pixels or even the image type (e.g., grayscale, halftone, text). Identifying a fill-order that attempts to reproduce an edge in the input image is similar to characterizing a preferred dot growth direction (i.e., determining a fill-order) in antialiased rendering (AAR).

Methods used by AAR processes for examining a target and neighboring pixels to identify a fill-order can be modified to preferentially treat all pixels as, being within an edge. For example, methods used by AAR processes can be modified to: (a) use the centroid of all neighboring pixels to determine if the target pixel is to the left, right, above or below an "edge" and shifting high addressable pixel events accordingly; (b) use neighboring gray pixel information to shift or cluster high addressable pixel events toward darker gray neighbors rather than away from gray pixels; or (c) use templates or look-up tables to identify special pixel patterns and their respective fill-orders. Additional details of methods for identifying a preferred rendering pattern (fill order) are described in U.S. patent application Ser. No. 09/046,414 entitled "Method, to Enable the Recognition and Rendering of Antialiased Images," by R. Loce et al. which is hereby incorporated by reference herein.

Any of the above described methods can be used to identify a fill-order. Moreover, the analysis of neighboring pixels to estimate the location of an edge may be generalized to slope detection methods. Beneficially, using slope detection methods, the fill-order is determined by analyzing neighboring pixels and filling the high addressable pixel events from the direction of darker neighbor(s). For example, when generating high addressability pixels using a 3×1 pixel window centered on the target pixel, the fill-order can be identified by ascertaining the difference between the target pixel and each neighbor and filling the high addressable pixel from the direction of darker neighbor(s).

Figure 6:
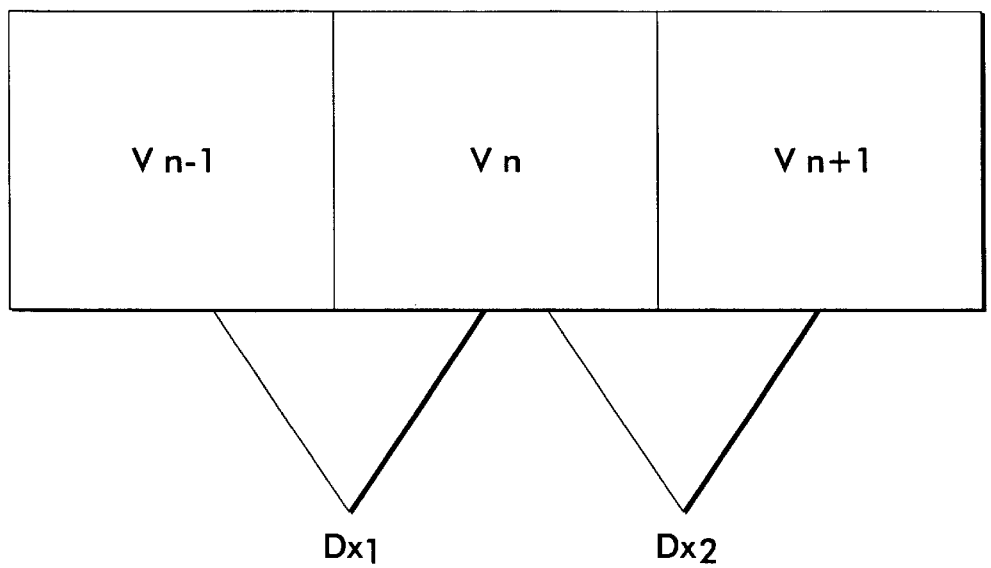
FIG. 6 is an exemplary 3×1 pixel window employed by an embodiment of the present invention.

That is, using a 3×1 pixel window centered on the target pixel $X_n$ as illustrated in FIG. 6, the gradients $dx_1$ and $dx_2$ are determined according to:

$$dx_1 = X_n - X_{n-1} \tag{1}$$

$$dx_2 = X_{n+1} - X_n \tag{2}$$

Based upon the gradients $dx_1$ and $dx_2$, the fill-order for the target pixel can be determined using the following rules:

$$\text{If } dx_1 > 0 \text{ and } dx_2 < 0 \text{ then Center Fill} \tag{3}$$

$$\text{If } dx_1 > 0 \text{ and } dx_2 > 0 \text{ then Right Fill} \tag{4}$$

$$\text{If } dx_1 < 0 \text{ and } dx_2 < 0 \text{ then Left Fill} \tag{5}$$

$$\text{If } dx_1 < 0 \text{ and } dx_2 > 0 \text{ then Split Fill} \tag{6}$$

Having determined an appropriate fill-order for the target pixel, block 82 can generate a rending tag identifying the fill-order to use in generating the high addressability pixels. The four fill-orders listed above can easily be expressed with rendering tags as follows: Center Fill=00; Right Fill=01;

Left Fill=10; and Split Fill=11. It will be appreciated that the above method may be extended to a 3×3 window to select a fill-order for high addressability pixels having addressability resolution in two dimensions.

Having determined an appropriate fill-order for the target pixel and generating the corresponding rendering tag at block 82, block 84 generates a high addressability pixel for the target pixel. Block 84 uses the gray level value of the target pixel, and beneficially marking process characteristics to determine the appropriate number of high addressability pixel events to be filled. The rendering tag generated at block 84 identifies the desired fill orientation for the high addressability pixel events. When employing marking characteristics, block 86 notes the marking process characteristics of the current image and provides this information to block 84. More specifically, the signals employed to render high addressability pixels have an effect within the output image that may be thought of as the amount darkness generated, the resulting shift in an edge, the resulting line thickness, or the resulting pixel density. The possible output signals must be calibrated so as to characterize the effect they generate. Then knowing their effect, a given signal can be used in the most appropriate image structure setting. This calibration process is somewhat analogous to calibrating halftone patterns to achieve certain densities for certain inputs.

Figure 7:
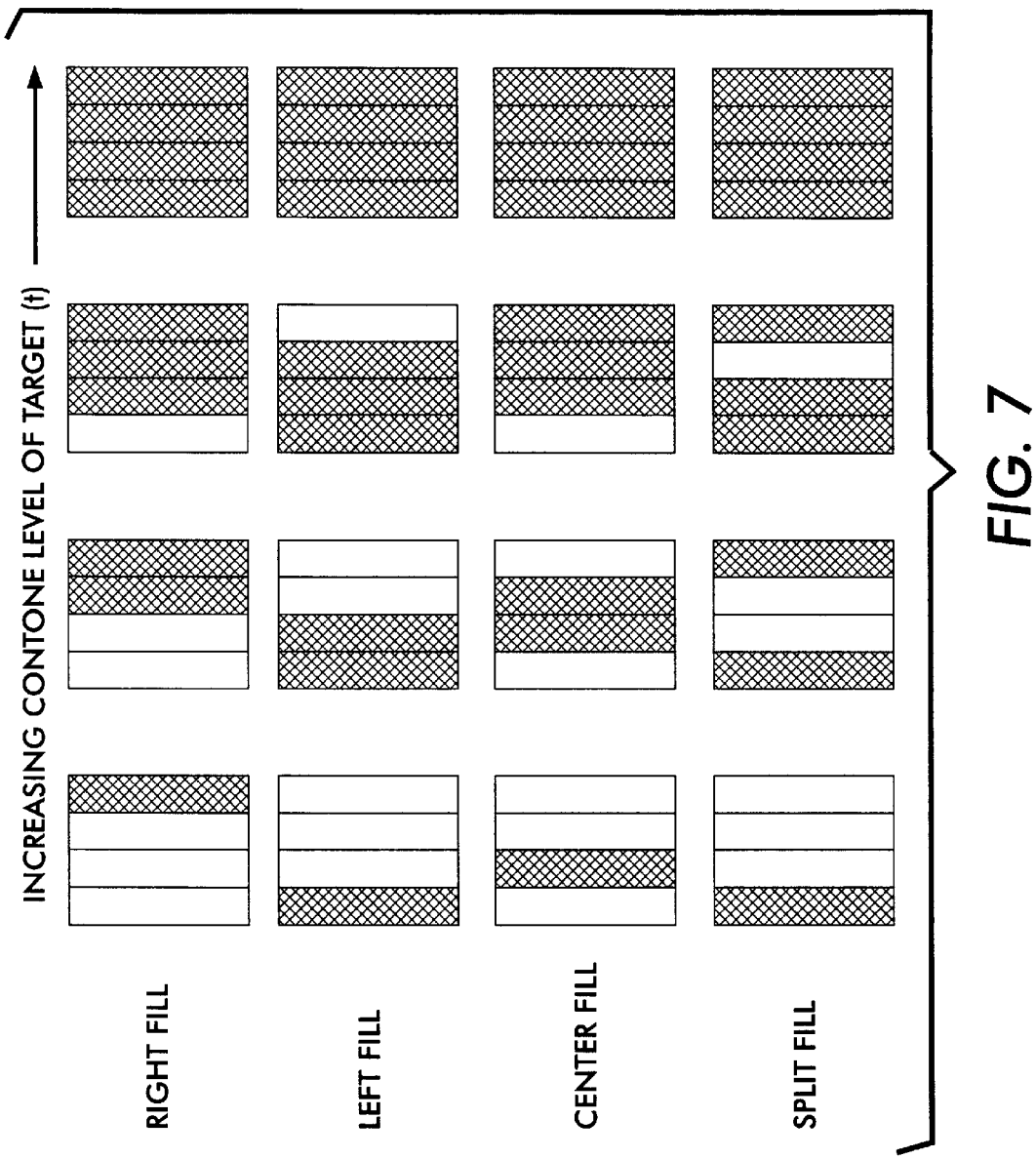
FIG. 7 illustrates various high addressability pixel rendering patterns.

Based upon the marking characteristics and the gray level value of the target pixel, block 84 determines the number of high addressable pixel events. Using the number of high addressable pixel events and the rendering tag from block 82, block 84 provides a high addressability pixel having the appropriate number of high addressability pixel events with the desired fill orientation. Block 84 may generate high addressability pixels based upon the rendering tag and the number of high addressability pixel events using a predetermined generation algorithm. Alternatively, block 84 may use the rendering tag, the gray level value of the target pixel, and the marking process characteristics as entry to a look-up table 88 or similar data store comprising a set of possible high addressability pixels to retrieve the appropriate high addressability pixel. Referring to FIG. 7, there is shown an illustration of one set of possible high addressability pixels that may be created in one embodiment (e.g., 4×high-addressability, fast scan resolution) of the present invention. As illustrated, for example in the Left Fill situation, the high addressability pixel events are filled from the left using progressively (depending upon the gray level value of the target pixel) wider exposure pulses until a pixel or image dot is completely filled.

The high addressability pixel generated at block 84 is provided as print ready data 42 from which print engine 50 can generate an output document. Optionally, block 84 also provides the high addressability pixel to error generation block 90. At error generation block 90, the high addressability pixel generated at block 84 is analyzed to estimate the gray-level quantization error, if any, incurred by the chosen fill-order.

A gray-level quantization error is a measure of the difference in the total gray content of an image neighborhood incurred when an image comprising pixels having one set of gray levels is converted to an image comprising pixels having a different set of gray levels. A gray-level quantization error often will be incurred when there are fewer, or different, rendering states in the output pixels than the input pixels. For example, the high addressability pixels shown in FIG. 7 have eight possible rendering states or rendering patterns for each fill-order. Each rendering state of a fill-order produces a specific gray level density (area coverage) when written or displayed. That is, each fill-order has eight possible gray levels. However, each multi-bit target pixel may have a different number of gray levels. Furthermore, even if the pixels have the same number of gray levels, the gray levels of the target pixel may not exactly match the gray levels of the high addressability pixel. Thus, when converting from one of the gray levels associated with the multi-bit pixel to a high addressability pixel, a quantization error may be incurred that manifests itself as a local density error. On a macro scale, the error may appear as a noticeable pattern defect or the error may result in an image region being too light or too dark.

Block 90 estimates the quantization error by comparing the gray level of the target pixel with the gray level density (area coverage) that is expected to be produced by the high addressability pixel in the output document. A table 92 comprising the expected densities of the rendering states for each fill-order can be generated in advance through a calibration process. A preferred calibration process initially employs the marking device (e.g., printer) to generate the candidate rendering cells in various configurations and neighboring various structures. Based on such a print, measurements of density, edge position, and/or other relevant metrics are taken. These measurements indicate (provide an estimate) of the output densities generated by the rendering cells in a printed image. It should be appreciated that models of the marking process could be used in place of or in conjunction with the actual marking process. Accordingly, block 90 compares the gray level of the target pixel with the expected gray-level density of the high addressability pixel to derive a rendering error signal that provides a measure of the gray-level quantization error for the high addressability pixel.

Block 94 receives the rendering error signal from error generation block 90 and diffuses the error onto unprocessed neighboring pixels to generate modified neighboring pixels 96. Error diffusion is a well-known method of processing image data wherein the quantization error is distributed or diffused onto the unprocessed (downstream) pixels. Generally, in an error diffusion process the quantization error is passed or diffused to a selected group of downstream pixels in accordance with a set of error weighting coefficients. The downstream pixels receiving a weighted error as well as the weighting coefficients can remain constant or be dynamically modified. The diffusion of a quantization error from a high addressability pixel onto neighboring pixels is analogous to cell-to-cell error diffusion where, in the present, high addressability pixel is equivalent to a halftone cell and the growth of the high addressability pixel events was selected adaptively by examination of neighboring pixels. A discussion of cell-to-cell error diffusion can be found in "Dot-to-Dot Error Diffusion," Z. Fan, Journal of Electronic Imaging, pp 62–66, 1993, which is hereby incorporated by reference for its teachings.

More information on error diffusion and weighting coefficients can be found in the following references which are incorporated by reference herein for their teachings: U.S. Pat. No. 5,353,127, entitled "Method For Quantization Gray Level Pixel Data With Extended Distribution Set" to Shiau et al.; U.S. Pat. No. 5,608,821 entitled "Method Of High Addressability Error Diffusion" to Metcalfe et al.; U.S. Pat. No. 5,696,601 entitled "System And Method For Redistributing Error Values From An Error Diffusion Process" to Metcalfe et al.; and U.S. Pat. No. 5,768,432 entitled "System And Apparatus For Pixel Growth Compensation In A Hybrid Error Diffusion Process" to Schweid. It should be appreciated that the references cited above are but a small sample of the available error diffusion techniques known in the art and that the present invention is not meant to be limited to the diffusion techniques shown therein.

In summary, processing blocks 80 and 82, which may be thought of as a single function or module performing a tagging operation, use a target pixel value, neighboring pixel values, and marking process characteristics to generate a signal identifying a fill-order that fills high addressability pixel events to attempt to reproduce an edge. Processing block 84 together with block 86 may be thought of as a single function or module that generates a high addressability pixel in response to the fill-order from block 82, a target pixel value, marking process characteristics (block 86), and, optionally, a set of rendering states (block 88). Finally, processing blocks 90 and 94, which also may be though of a single function or module, execute an error diffusion process that estimates a quantization error associated with the high addressability pixel from block 84 and disperses the error over a group of unprocessed pixels. It should be noted that the error diffusion process illustrated by blocks 90, 92, 94, 96 are optional; however, they can be included to improve the accuracy of the rendering process.

Having described an architecture and a method for generating high addressability pixels in accordance with the present invention, attention is now turned to the description of exemplary systems and applications that employ the above-described architecture and method.

Figure 8:
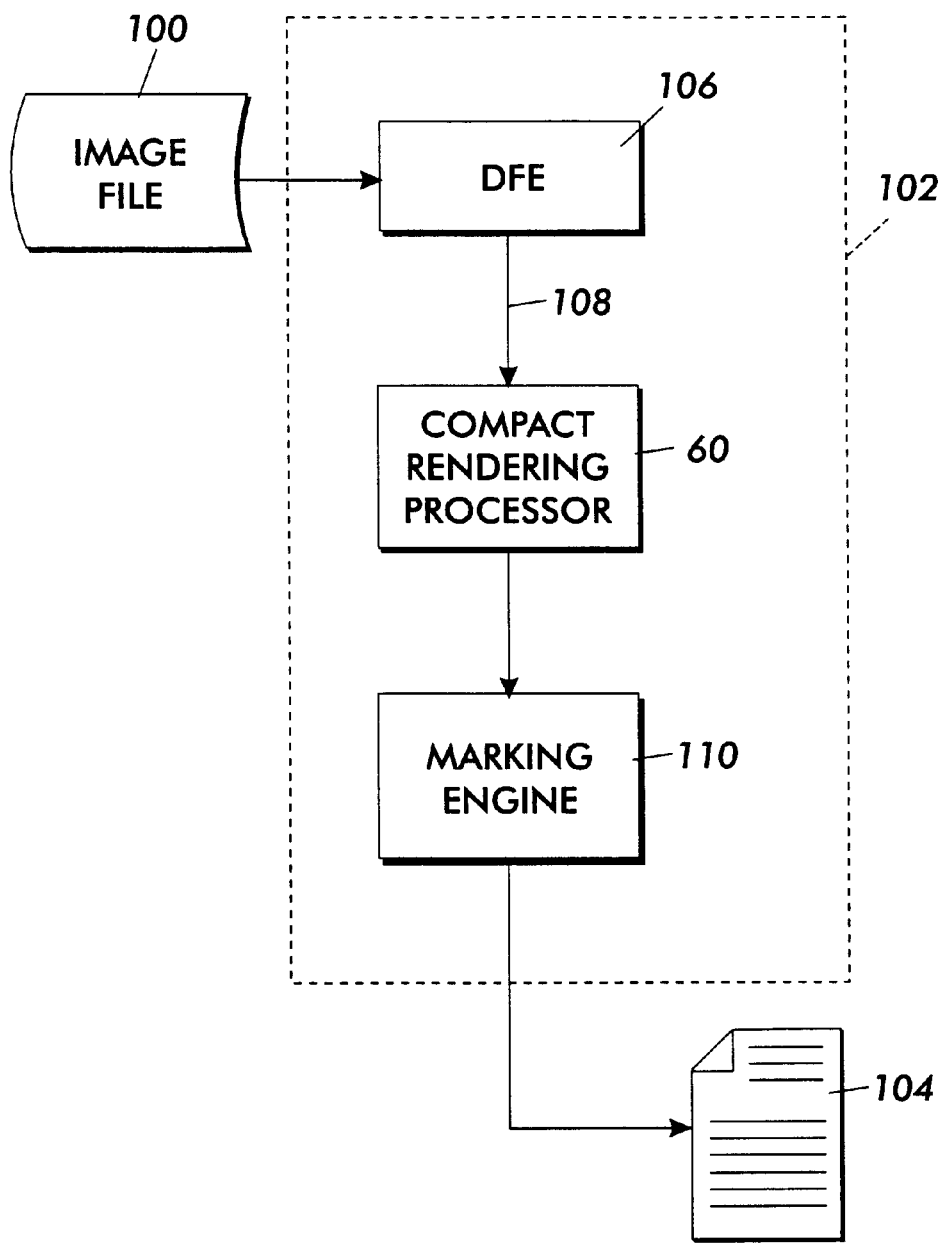
FIG. 8 is a block diagram of a printing system incorporating a compact rendering processor in accordance with the present invention.

FIG. 8 is a block diagram of a digital printing system that employs an imaging architecture and method for generating high addressability pixels in accordance with the present invention. As shown in FIG. 8, image file 100, including a document image in a suitable page description language (PDL), is received by digital printer 102 to produce printed output in the form of enhanced print 104. Within digital printer 102 is a digital front end DFE 106 that transforms image file 100 into multi-bit image data 108. Beneficially, multi-bit image data 108 comprises a plurality of scanlines with each scanline further comprising a plurality of multi-bit pixels. Multi-bit image data 108 is passed to compact rendering processor 60 where the multi-bit image data is rendered into binary high addressability pixels as was described above in reference to FIGS. 4–6. The high addressability pixels are passed to marking engine 110 for exposure and development, as will be generally described with respect to the raster output scanning system of FIG. 9, to produce enhanced output print 104.

In particular, image file 100 in the form of a PDL file with contone data is received by DFE 106. After receipt, DFE 106 processes image file 100 using any of a number of well-known processing techniques to decompose the PDL or other document information, and to process the document image in accordance with such information to generate multi-bit image data 108. As previously described, DFE 106 includes a multi-level halftoning process operating on pictorials and tints within the document image data to generate multi-level halftone regions within the multi-bit image data 108. Multi-level halftones can be generated in.DFE 106 in any of a number of a number of ways. For example, in the DFE multi-level halftoning could be performed using commonly available gray screening software such as is generally available from Adobe®. Alternatively, the multi-level halftoning could be implemented in a hardware halftoner (not shown) coupled between DFE 106 and rendering processor 60 performing a hyperacuity function-based screening such as is described in U.S. Pat. No. 5,410,414 entitled "Halftoning in a Hyperacuity Printer" by Curry, incorporated by reference herein. Yet another possibility for generating multi-level halftones is the use of multi-level threshold arrays in a software or hardware implementation.

Information on multi-level halftoning, also referred to as multi-bit or gray level halftoning, can be found in U.S. Pat. No. 4,868,587 entitled "image Halftoning System for Printers," by Loce et al., U.S. Pat. No. 5,406,379 entitled "Method of Hybrid Halftone Printing," by Kingsley et al., U.S. Pat. No. 5,729,663 entitled "Method and Apparatus for Gray Screening" by Lin et al., Lama et al., "Hybrid (Gray Pixel) Halftone Printing," Journal of Imaging Technology, Vol 15, no 3, pp 130–135, 1989 and in Xerox Disclosure Journal; "A Partial Dot Algorithm For Multi-Level Pixel Halftone Cells"; vol. 14 No. 4 July/August 1989, pp. 175–176; Thomas Hendersonet et al. each of which are hereby incorporated by reference herein for their teachings.

Additionally, DFE 106 beneficially includes an antialias operation acting on text/line art to reduce or eliminate objectionable image artifacts caused by aliasing in the image sampling operation and thereby yield antialiased regions with multi-bit image data 108 as well. For instance, DFE 106 may decompose the PDL into a high-resolution (e.g., 2400 spi resolution) image and then perform any necessary image processing on the high-resolution image before reducing to a print resolution and transferring to the print engine and its associated rendering processor. The antialiasing may be performed in the process of reducing the resolution from a high resolution level to the output level.

Multi-bit image data 108 which may comprise one or more multi-level halftone regions and/or one or more antialiased line art regions is rendered to binary high addressability pixels by compact rendering processor 60. Rendering processor 60 receives multi-bit image data 108 and converts the multi-bit image data into high addressability pixels that produce images having compact dots and sharp edge features when processed through print engine 110. With properly treated data, compact rendering processor 60 is able to produce high quality output documents from multi-bit image data 108 having relatively few bits per pixel. For example, with proper tuning of the multi-level halftoning and anti-aliasing operations of DFE 106, processor 60 requires as few as 3 bits/pixel.

More specifically, as described above in reference to FIGS. 4–6, processor 60 includes a tagging processor 62, a rendering processor 66, and, optionally an error diffusion processor 68. The tagging processor analyzes pixel values to identify a fill-order that fills high addressability pixel events in a manner to attempt to reproduce an edge. The rendering processor generates a high addressability pixel in response to the fill-order, marking process characteristics, and, optionally, a set of rendering states and passes the high addressability pixels to marking engine 110 and the error diffusion processor. The error diffusion processor estimates a quantization error associated with the high addressability pixel and distributes the error over a group of unprocessed pixels.

Figure 9:
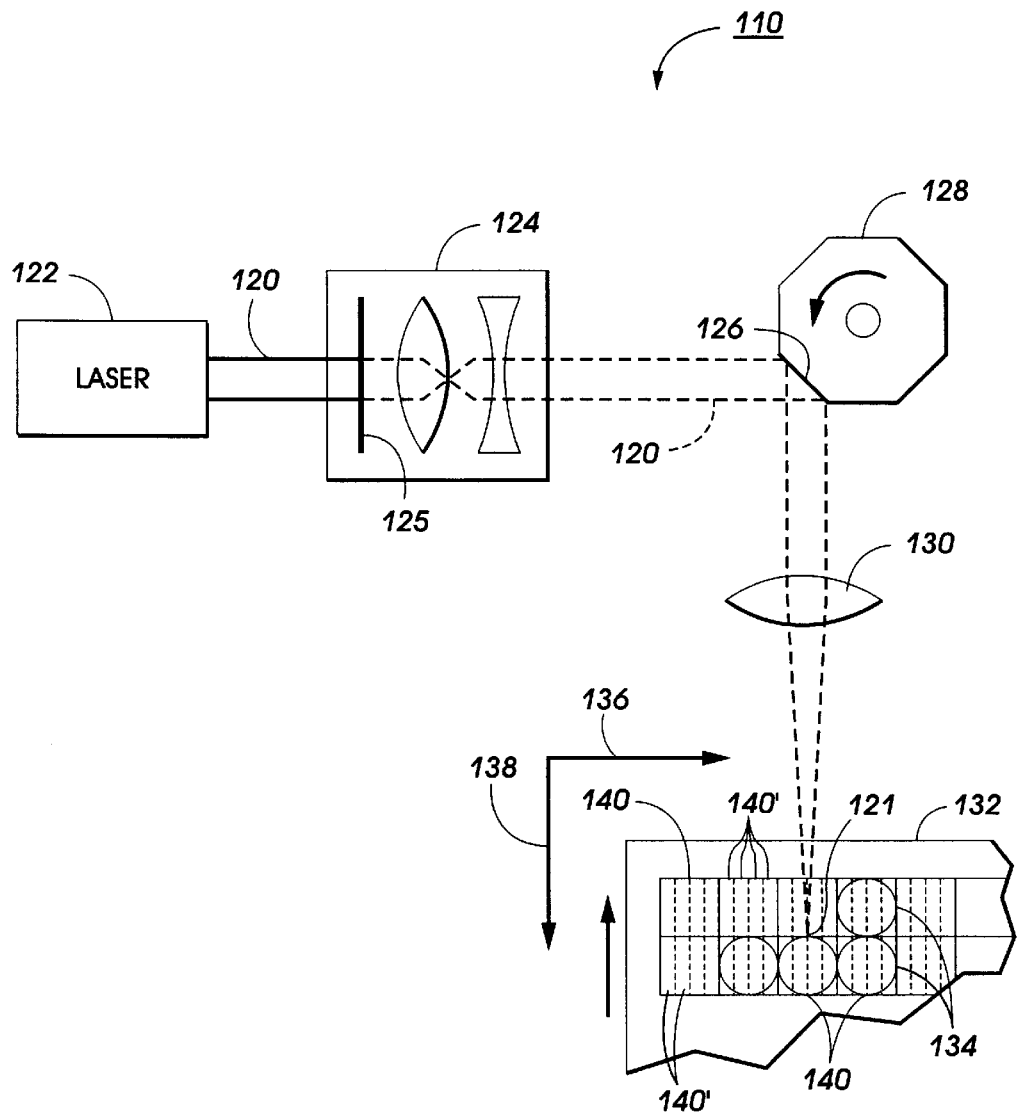
FIG. 9 is a schematic illustration of a raster output scanner, illustrating a portion of a photosensitive image plane.

Referring now to FIG. 9, upon receiving the, high addressability pixels generated by compact rendering processor 60 (FIG. 8) a marking engine 110 in the form of a raster output scanner (ROS) may be used to print the high addressability pixels. In marking engine 110, beam 120, emitted from laser 122, passes into conditioning optics 124 that may include modulator 125. In response to high addressability pixels supplied to engine 110, modulator 125 either blocks or deflects beam 120, or allows the beam to pass through conditioning optics 124 to illuminate facet 126 of rotating polygon 128. Alternatively, the high addressability pixels could directly modulate laser 122. In addition, more than a single laser source or beam could be employed to practice the invention. Another common image writing device is the print bar, which typically consists of an array of light emitting diodes or liquid crystal shutters. Those skilled in the art appreciate that the enhanced printing mode described herein may be extended to operation employing a print bar.

After reflecting off facet 126, beam 120 passes through conditioning optics 130 and exposes a spot 121 on photosensitive image plane 132. Rotating polygon 128 causes laser spot 121 to scan across the image plane in a line 134 in what is commonly referred to as the fast scan direction, represented by arrow 136. In addition, as facet 126 rotates, image plane 132 moves in a slow scan direction, substantially perpendicular to the fast scan direction, as represented by arrow 138. Movement in the slow scan direction is such that successive rotating facets of the polygon produce successive scanlines 134 that are offset from each other in the slow scan direction. Subsequent to exposure the latent electrostatic image remaining on photosensitive image plane 132 is developed using any commonly known charge sensitive development techniques so as to produce a developed image that is transferable to an output medium thereby producing the enhanced output.

Each scanline 134 consists of a row of pixels 140 produced by the modulation of the laser beam as laser spot 121 scans across the image plane. As beam 120 scans across the scan line, laser spot 121 either illuminates or does not illuminate individual high addressability pixel events 141 within a high addressability pixel 140, in accordance with the high addressability pixels provided to the ROS. In general, the high addressability pixels may be characterized as a serial stream of pulses, where a logic one or a pulse specifies that the beam is to illuminate the surface, while a logic zero, no pulse, will result in no illumination.

The system and method for generating high addressability pixels of the present invention is also useful in reproducing a document including both text/line art and halftoned images that has been digitized with a document scanner. Using the compact rendering process of the present invention, image data in the form of scanned halftone images and/or scanned text/line art is converted into high addressable form suitable for reproducing the image with its given halftone screen. That is, the compact rendering process of the present invention allows reproduction of scanned halftoned images without descreening.

Figure 10:
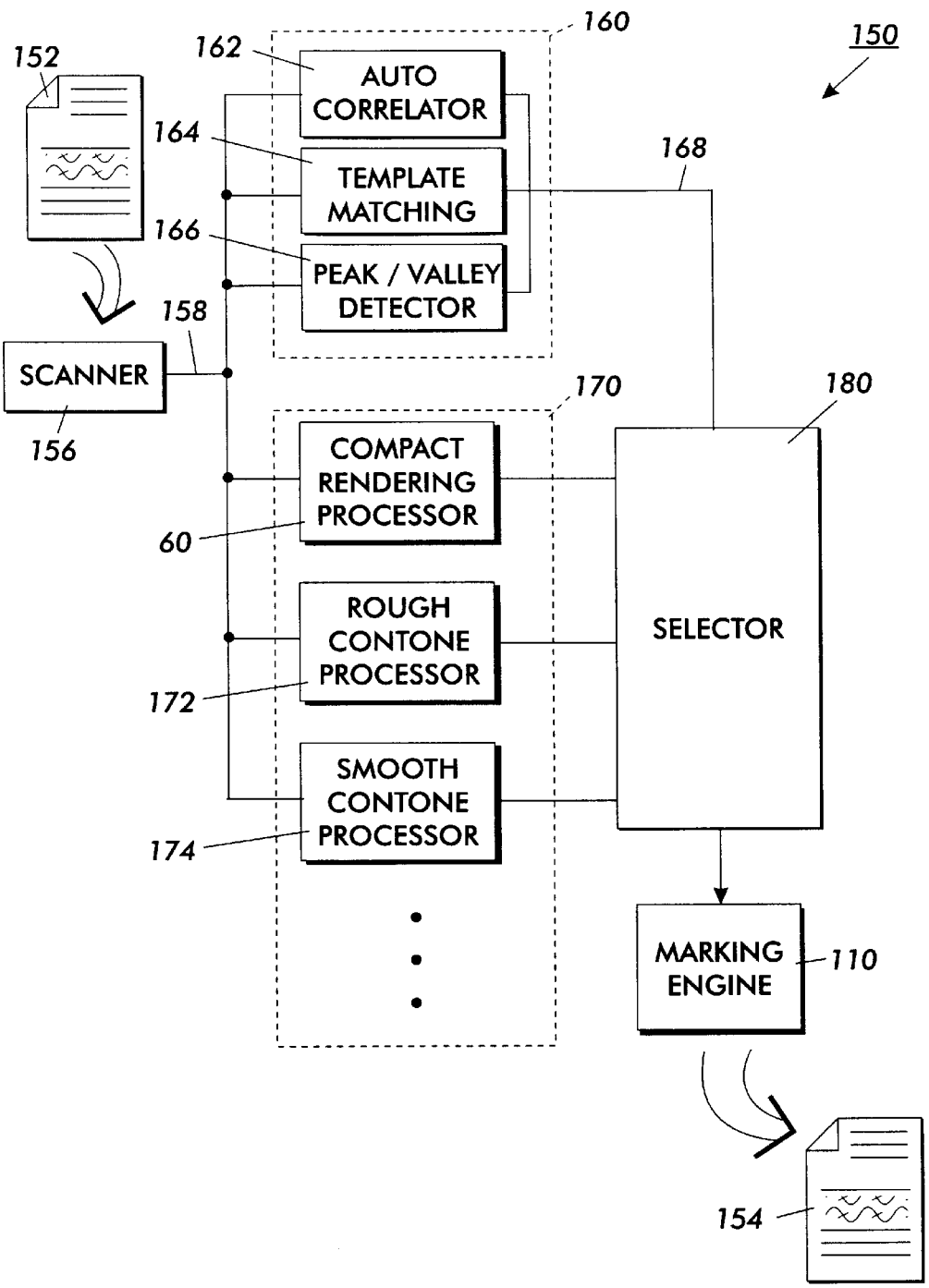
FIG. 10 is a block diagram depicting the data flow through a digital copier incorporating a compact rendering processor in accordance with the present invention.

Turning now to FIG. 10, there is shown a block diagram illustrating the data flow in a digital copier 150 that reproduces an input document 152 to generate an output document 154 that maintains the original halftone screen of the input document. As shown in FIG. 10, copier 150 includes scanner 156 which scans document 152 and outputs scanned video image data 158. Scanner 156 which may comprise a raster input scanner (RIS) contains any illumination lamps, optics, charge coupled device (CCD array) or full width array, and mechanical drives necessary to capture an image from document 152 and convert it to video image data 158. Beneficially video image data 158 is a digitized representation of document 152 comprising a series of raster scanlines each of which further comprises a series of multi-bit pixels.

Video image data 158 is directed to segmentation circuit 160 and image processing circuit 170. It is understood that scanner 156 can be directly coupled to segmentation circuit 160 and image processing circuit 170 or physically remote therefrom and coupled over a public switched telephone network, a local or wide area network, an intranet, a wireless transmission channel, any other distributing network, or the like.

Segmentation circuit 160 receives video image data 158 and analyzes the image data pixels to identify different image types or imagery present. Segmentation circuit 160 is made up of any of a number of sub-modules (e.g., autocorrelator 162, template matching processor 164, and peak/valley detection circuit 166) that analyze and classify video image data 158, on a per pixel basis, into one of several possible image types (e.g., pictorials, smooth contone, rough contone, text/line art, text on tint, background, halftones of various frequencies, etc.). Each of the sub-modules typically operate on an M×N pixel window that slides across and down the video image data. Segmentation circuit 160 generates a pixel classification signal 168, known as a tag or effect pointer, that is used to specify different filtering, rendering and other image processing operations.

Image processing circuit 170 is made up of any number of sub-processing sections, (e.g., compact rendering processor 60, rough contone processor 172, or smooth contone processor 174), which perform image processing operations on the same block of image pixels as segmentation circuit 160. Each sub-processing section performs image processing operations that are adapted to improve the image quality of a distinct class of imagery to generate processed image data. Optionally, image processing circuit 170 may receive the output of segmentation circuit 160 as an input to control the image processing. That is, image processing circuit 170 may use signal 168 to determine the processing applied to a region based upon the classification to optimize of the processing of the sub-processors based. Image processing circuit 170 is shown comprising compact rendering processor 60 which operates in a manner described above in reference to FIGS. 4–6 to generate high addressability pixels from image data identified as halftones of various frequencies or text/line art.

Selector 180 uses information provided by segmentation circuit 160 to control the image processing of circuit 170. More specifically, the tag signal 168 is provided to selector 180 to control the selection of the processed image data from image processing circuit 170 coupled to an output device. As shown, selector 180 couples the selected processed image data to an output device such as marking engine 110 which prints output document 154 that maintains the original halftone screen of the input document. It is understood that selector 180 can be coupled to alternative output devices for displaying an image such as a CRT, an active or passive matrix LCD, an active or passive LED display, an ink jet printer, or the like. Additionally, the output device can include a storage device such as a RAM, a hard drive and disk, a floppy drive and disk, an optical drive and disk, a flash memory or the like or a computer processing device. Moreover, the output device can be physically remote from selector 180 and coupled to over a public switched telephone network, a local or wide area network, an intranet, a wireless transmission channel, any other distributing network, or the like.

Figure 11:
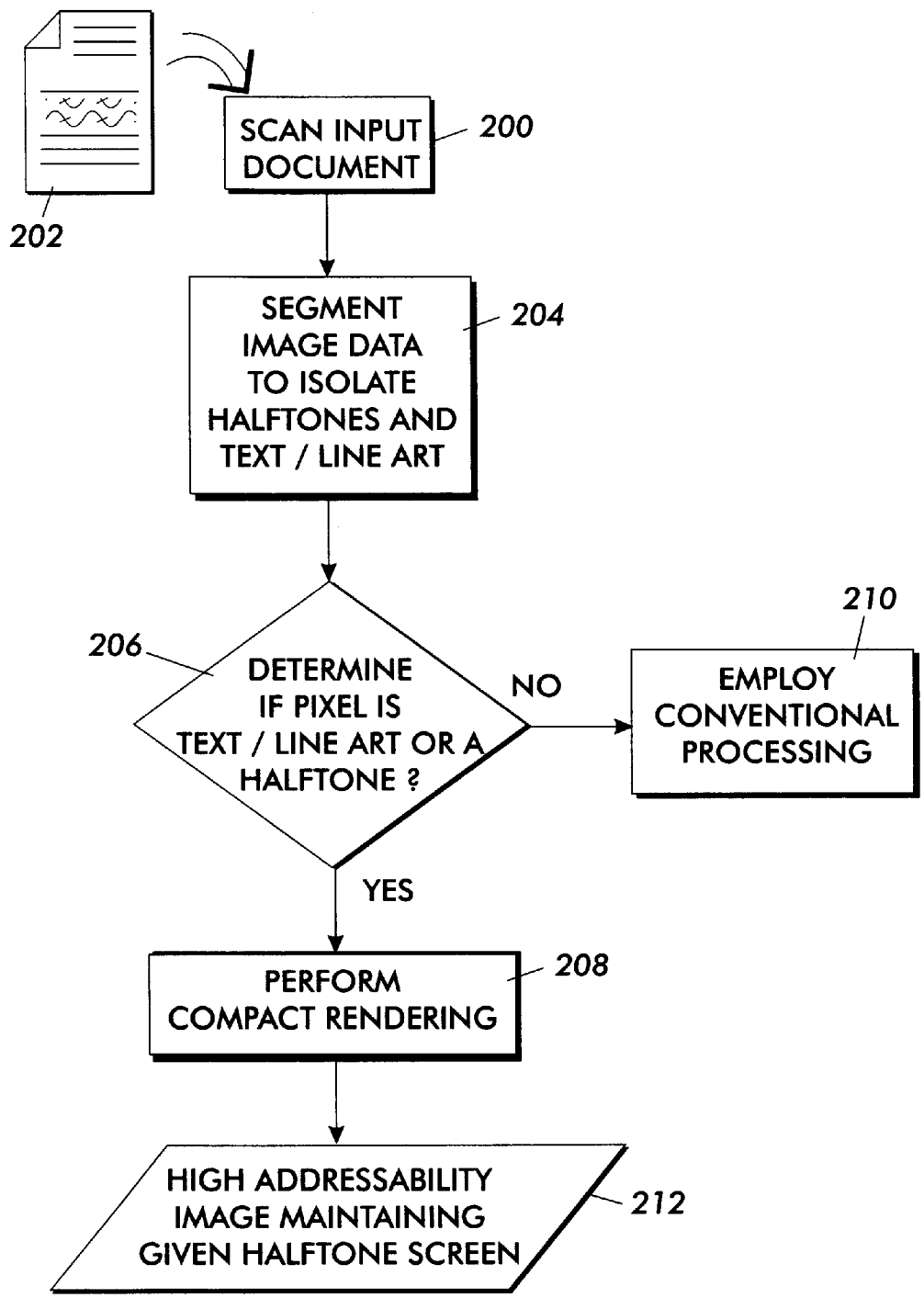
FIG. 11 is a schematic illustration of a method for reproducing scanned halftone screens.

FIG. 11 is a schematic illustration of the various steps in a method for reproducing scanned halftone screens and an alternate representation of the scanning architecture of FIG. 10. In particular, the method generates an output image in a high addressability format that maintains the given halftone screen of a scanned document. Referring to FIG. 11, at block 200 a printed input document 202 including halftoned images thereon is scanned to generate video image data. At block 204, the scanned image data is segmented to identify and isolate any halftones and text/line art regions within the scanned image data from other image types. Image segmentation is well known in the art and generally uses any of a number of classification functions (e.g., auto-correlation, frequency analysis, pattern or template matching, peak/valley detection, histograms, etc.) to analyze video image data and classify image pixels as one of several possible image types (e.g., pictorials, smooth contone, rough contone, text/line art, text on tint, background, halftones of various frequencies, etc.).

More information on image segmentation techniques can be found in the following commonly assigned United States Patents which are hereby incorporated herein by reference: U.S. Pat. No. 4,194,221 entitled "Automatic multimode continuous halftone line copy reproduction" to Stoffel; U.S. Pat. No. 4,811,115 entitled "Image processing apparatus using approximate auto correlation function to detect the frequency of half-tone image data" to Lin et al; U.S. Pat. No. 5,193,122 entitled "High speed halftone detection technique" to Kowalski, et al.; and U.S. Pat. No. 5,778,156 entitled "A method and system for implementing fuzzy image processing of image data" to Shweid, et al. It will be apparent that, when used in the present method, the above-listed image segmentation techniques may be simplified as, for those pixels (image regions) that are identified as text/line art or halftones, the segmentation analysis does not need to distinguish between text/line art and halftones or between halftones of various frequencies.

At test block 206, a determination is made as to whether a pixel (image region) represents either a halftone or text/line art. Pixels tagged as halftones or text/line art are directed to block 208 where a compact rendering process is employed. Pixels tagged as image types other than halftones or text/line art are directed to processing block 210 where conventional processing is employed to process the pixel according to the properties of its image class. Block 208 employs a compact rendering process to generate high addressability pixel events for those pixels (image regions) identified as being either text/line art or halftones. Specifically, block 208 performs the compact rendering method described above and generally illustrated in FIG. 5 to generate high addressability images 212 that maintain the given halftone screen of the halftones within the input document 202.

In addition to operating on gray (multi-level) halftones received from a DFE or a scanner, as illustrated in the printing and scanning systems described above, the compact rendering system and method of the present invention can also be used to manipulate binary image data such as binary halftoned images, high addressability images (including halftones and text/line art), or the like. In particular, the compact rendering of the present invention can be used to provide a compensation warp to binary images for electronic registration and to rotate high addressability images.

Figure 12:
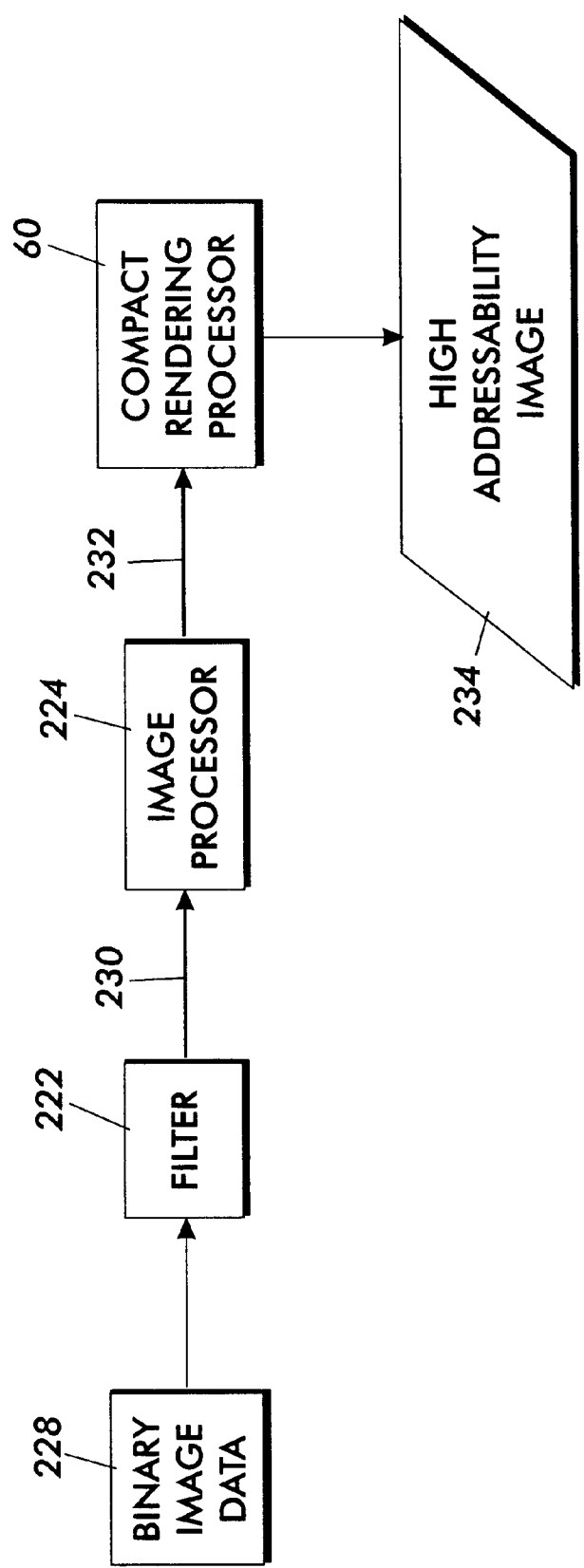
FIG. 12 shows a functional block diagram of a system for manipulating binary high addressability images.

Turning now to FIG. 12, there is shown a functional block diagram of a system 220 for manipulating binary images that incorporates compact rendering. Image processing system 220 includes image filter 222 to convert binary image data to gray image data, an image manipulation processor 224 operating on the gray image data, and a compact rendering processor 60 to render the processed image to a binary high addressability format.

System 220 operates on binary image data 228 such as binary halftoned images, high addressability images and the like as may be available from a DFE. System 220 receives binary image data 228 at filter 222 where the image data is averaged to generate temporary gray-scale image data 230. More specifically, after receiving binary image data 228, filter 222 converts the binary image data to multi-bit pixels having increased gray-scale quantization, i.e., converts the original binary image data 228 to gray-scale image data 230. Furthermore, if binary image data 228 comprises high addressability data, image filter 222 may also resample the image to provide isomorphic resolution.

To accomplish this process, image filter 222 performs a filtering process on binary image data 228. Beneficially, low-pass filtering is applied to the binary image data. Low-pass filtering is a conventional method by which a grayscale image is reconstructed or originally constructed from a binary image. A low-pass filtering process may be understood as an averaging process, since the low-pass filter averages neighboring pixels. A low-pass filter transforms certain observed pixel patterns in a windowed neighborhood of binary image data 228, into a corresponding grayscale value for the target pixel of that window. Accordingly, image filter 222 uses a window to move across binary image data 228 from target pixel to target pixel. The window (neighborhood) may include any number of pixels, and the target pixel may be any pixel within the window. As a result, processing using the low-pass filter results in a more finely quantized image than the original binary image. That is, the resulting image will possess more gray-scale levels. The specific number of gray-scale levels (degree of quantization) will vary depending on the particular application.

The specific technique which the image filter 222 uses to accomplish the filtering process may vary between applications. Image filter 222 may simply determine the number of pixels (or pixel events) that are "on" or "off" in the observed window to obtain a gray-scale value. Beneficially, filter 222 uses information regarding the particular position of the "on" pixels (pixel events), as well as the total number of "on" pixels (pixel events, in determining a gray-scale value for a particular target pixel. One possible embodiment of employing pixel position information uses a look-up table comprising a list of possible templates or pixel patterns each of which has an associated gray-scale value.

If binary image data 228 comprises high addressability image data, filter 222 may also include a resampling process to eliminate any difference in sampling rate between the fastscan and slowscan dimensions. The resampling process reduces the high addressability of the image to isomorphic addressability thereby yielding an isomorphic image suitable for warping or rotation. It should be recognized that filter 222 may perform the low-pass filtering operation and the resampling operation as separate processes, or alternatively, the two operations may be combined into a single operation performed by a single combined image filtering and resampling circuit.

Gray-scale image data 230 is coupled to image processor 224 wherein the gray-scale image data is manipulated to generate processed gray-scale data 232. In particular, it is anticipated that processor 224 manipulates gray-scale image data 230 to rotate the entire gray-scale image or a portion thereof and/or to provide a compensation warp to the gray-scale image data such that image separations print in registration (electronic registration). Having generated an isomorphic gray-scale image 230 at filter 222, the image can be rotated using any of a number of rotation processes. For example, the gray-scale image can be rotated using a mapping technique wherein for each predetermined rotation angle there is provided a set of remapped pixel locations each of which identify the location of an original pixel within the rotated image. Alternatively, grayscale image data can be rotated using a morphological filtering process.

In addition to image rotation, it is anticipated that image processor 224 may warp gray-scale image data 230 data by realigning the pixels therein to compensate for ROS beam scan trajectory distortions and improve image layer registration such that color image separations print in register when written with ROSs possessing different beam scan trajectory characteristics. In general, applying a compensation warp to gray-scale image 230 realigns the pixels in the gray-scale into a warped image comprising a plurality of warped scanlines that compensate for distortions in the beam scan trajectory of a ROS.

Briefly, to generate a warped pixel, processor 224 identifies the output position of the warped pixel based upon the beam scan trajectory of the ROS. From the output position, processor 224 identifies those pixels within gray-scale image data 230 that will compensate for the ROS beam scan trajectory. Processor 224 then retrieves the identified pixels from gray-scale image data 230 and combines the retrieved pixels into a single warped pixel by interpolating or averaging the values of the retrieved pixels. Processor 224 generates a warped image by repeating the above for each pixel within gray-scale image data 230. Image warping is described in further detail in U.S. patent application Ser. No. 09/217,224 entitled "System For Electronic Compensation of Beam Scan Trajectory Distortion" by Loce et al which is hereby incorporated by reference herein.

After image manipulation, the processed gray-scale image data 232 is coupled to compact rendering processor 60 wherein the processed image data is rendered to a binary high addressability format. Compact rendering processor 60 operates in substantially the same manner as previously described in reference to FIGS. 4–6. That is, compact rendering processor 60 receives gray-scale image data 232; analyzes a target and neighboring pixel to identify a fill-order that fills high addressability pixel events to attempt to reproduce an edge, generates a high addressability pixel in response to the identified fill:order, the target pixel value, and marking process characteristics; and, optionally, estimates a quantization error associated with the high addressability pixel and diffuses the error over a group of unprocessed pixels.

One skilled in the art would understand that the processors and processing modules described above can embody or be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. Furthermore, specific algorithms may be accomplished using software in combination with specific hardware. In general, any device capable of implementing a finite state machine that is in turn capable of implementing a process described above can be used to realize the associated processor or module.

What has thus been described is an imaging architecture and method for generating high addressability binary images from multi-bit pixels. The present invention provides an image path that enables rendering of both pictorials and antialiased text/line art into high addressability binary images that, when output on suitable media, produce documents having compact halftone dots and sharp edges. The present invention can be adapted for use in digital reproduction systems. In a reproduction system, the present invention uses neighboring pixel information to convert a scanned contone version of a halftoned image to a high addressability form. Additionally, the present invention can reproduce scanned halftone images that maintain the original halftone screen of the scanned image.

What is claimed is:

1. A method of processing multi-bit image data, comprising:
   identifying an observation window within said multi-bit image data, said observation window including a target pixel and a neighboring pixel;
   determining a fill-order for said target pixel based on a difference between said target pixel and a first neighboring pixel; and
   rendering said target pixel as a function of said fill-order.

2. The method of claim 1, wherein said step of determining a fill-order for said target pixel further comprises determining a difference between said target pixel and a second neighboring pixel.

3. The method of claim 1, wherein said multi-bit image data includes a multi-level halftone region and said target pixel is a pixel within said multi-level halftone region.

4. The method of claim 1, wherein said step of rendering said target pixel Includes determining a number of high addressability pixel events to fill for said target pixel.

5. The method of claim 1, wherein said step of determining a fill-order identifies a rendering pattern that fills high addressability pixel events from a darker pixel towards a lighter pixel.

6. The method of claim 1, wherein said step of rendering said target pixel generates a high addressability pixel and further including the step of diffusing an error resulting from said rendering step.

7. The method of claim 6, wherein said step of diffusing an error comprises:
   determining a quantization error; and
   distributing the quantization error to a preselected number of multi-bit image pixels.

8. The method of claim 7, wherein said step of determining a quantization error comprises:
   comparing the gray level of the target pixel with the gray level of the high addressability pixel; and
   generating a rendering error signal that is measure of a difference between an output density of the target pixel and an output density of the high addressability pixel.

9. The method of claim 7, wherein said step of distributing the quantization error distributes a weighted portion of the quantization error to a preselected number of multi-bit image pixels.

10. A compact rendering processor for processing multi-level halftone image data, comprising:
    a tagging subprocessor coupled lo receive said multi-level halftone image data, said tagging processor identifying a fill-order by examining the difference between the values of a target pixel and a neighboring pixel and generating a rendering tag; and
    a rendering sub-processor coupled to receive said target pixel and said rendering tag, said rendering processor being responsive to said rendering tag to generate a high addressability pixel for said target pixel.

11. The compact rendering processor of claim 10, wherein said rendering tag identifies a fill-order that attempts to reproduce an edge with said target pixel.

12. The compact rendering processor of claim 10, further comprising an error diffusion sub-processor coupled to receive said high addressability pixel from said rendering sub-processor, said diffusion sub-processor determining an error indicating the difference between the gray level of said target pixel and the gray level of said high addressability pixel and distributing said error to a group of pixels within said multi-level halftone image.

13. A printing system, comprising:

a digital front end adapted to receive an image file and generate multi-bit Image data; said digital front end operative to generate multi-bit image data having both multi-level halftone regions and antialiased pixels;

a tagging processor to generate a rendering tag for a target pixel within said multi-bit image data, said rendering tag identifying a fill-order based upon a difference between a value of said target pixel and a value of a neighboring pixel; and a rendering processor responsive to said rendering tag to convert said target pixel to a high addressability pixel; and a marking engine, coupled to said compact rendering module, for generating an image in response to said high addressability pixels.

14. The printing system of claim 13, further comprising a diffusion processor, coupled lo said rendering processor, said diffusion processor determining a quantization error and distributing said quantization error to a number pixels within said multi-bit image data.

15. The printing system of claim 14, wherein said diffusion processor distributes a weighted portion of said quantization error to a preselected number pixels within said multi-bit image data.

16. A method of processing image data, comprising:

receiving multi-bit image data, the multi-bit image data including a target pixel and a neighboring pixel;

determining a difference between a value of the target pixel and a value of at least one neighboring pixel; and identifying a fill-order for the target pixel using a result of the determining step.

17. The method of claim 16, wherein the step of identifying a fill-order identifies a fill-order that attempts to reproduce an edge with said target pixel.

18. The method of claim 16, wherein the step of identifying a fill-order identifies a rendering pattern that fills high addressability pixel events from a darker pixel towards a lighter pixel.

19. The method of claim 16, further comprising:

generating a high addressability pixel for the target pixel; and diffusing an error resulting from the generating step.

20. The method of claim 19, wherein the step of diffusing an error comprises:

determining a quantization error as a function a difference between an output density of the target pixel and an output density of the high addressability pixel; and distributing the quantization error to a preselected number of multi-bit image pixels.

21. The method of claim 20, wherein said step of distributing the quantization error distributes a weighted portion of the quantization error to a preselected number of multi-bit image pixels.

* * * * *